(12) United States Patent
Barbu et al.

(10) Patent No.: US 12,339,385 B2
(45) Date of Patent: Jun. 24, 2025

(54) POSITIONING IN MOBILE COMMUNICATION SYSTEMS

(71) Applicant: Nokia Technologies Oy, Espoo (FI)

(72) Inventors: Oana-Elena Barbu, Aalborg (DK); István Zsolt Kovács, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 560 days.

(21) Appl. No.: 17/848,467

(22) Filed: Jun. 24, 2022

(65) Prior Publication Data
US 2023/0003831 A1     Jan. 5, 2023

(30) Foreign Application Priority Data
Jul. 1, 2021   (EP) .................................... 21183016

(51) Int. Cl.
*G01S 5/10*     (2006.01)
*G06N 3/084*    (2023.01)

(52) U.S. Cl.
CPC .............. *G01S 5/10* (2013.01); *G06N 3/084* (2013.01)

(58) Field of Classification Search
CPC ...... G01S 5/10; G01S 2205/008; G01S 1/045; G01S 1/68; G01S 11/02; G06N 3/084; H04W 4/025; H04W 4/02
See application file for complete search history.

(56) References Cited

U.S. PATENT DOCUMENTS

| | | | |
|---|---|---|---|
| 2016/0337916 A1* | 11/2016 | Deenoo ................. | H04W 8/22 |
| 2018/0042045 A1 | 2/2018 | Choi et al. | |
| 2019/0132827 A1 | 5/2019 | Kundargi et al. | |
| 2021/0013954 A1 | 1/2021 | Zhao et al. | |
| 2022/0030390 A1* | 1/2022 | Manolakos ............... | G01S 5/10 |

OTHER PUBLICATIONS

"3rd Generation Partnership Project; Technical Specification Group Radio Access Network; NR; Requirements for support of radio resource management (Release 17)", 3GPP TS 38.133, V17.0.0, Dec. 2020, 1812 pages.

(Continued)

*Primary Examiner* — Dinh Nguyen
(74) *Attorney, Agent, or Firm* — Nokia Technologies Oy

(57) ABSTRACT

An apparatus, computer program and method is described comprising: obtaining, at a receiver, during a first phase of operation, one or more first downlink positioning reference samples from each of a plurality of communication nodes of a mobile communication system, wherein the receiver operates in a wide-beam or omnidirectional mode during the first phase of operation; determining first response estimates of channels between the receiver and each of said each communication nodes, based on the positioning reference samples obtained for the respective communication node; selecting, for each communication node, a receiver beam for receiving positioning signals from the respective communication node, based, at least in part, on the respective first channel response estimate; and receiving, at the receiver, in a second phase of operation, one or more second downlink positioning reference samples from each of the plurality of communication nodes using the selected receiver beams.

15 Claims, 10 Drawing Sheets

(56) References Cited

OTHER PUBLICATIONS

"3rd Generation Partnership Project; Technical Specification Group Services and System Aspects; Service requirements for the 5G system; Stage 1 (Release 18)", 3GPP TS 22.261, V18.1.1, Jan. 2021, 85 pages.

"3rd Generation Partnership Project; Technical Specification Group Services and System Aspects; Study on Communication for Automation in Vertical Domains (Release 16)", 3GPP TR 22.804, V16.3.0, Jul. 2020, pp. 1-197.

"New SID on NR Positioning Enhancements", 3GPP TSG RAN Meeting #86, RP-193237, Agenda: 9.1.1, Qualcomm Incorporated, Dec. 9-12, 2019, 4 pages.

"3rd Generation Partnership Project; Technical Specification Group Radio Access Network; NR; Physical channels and modulation (Release 16)", 3GPP TS 38.211, V16.4.0, Dec. 2020, pp. 1-133.

"5G; NR; Physical channels and modulation (3GPP TS 38.211 version 15.2.0 Release 15)", ETSI TS 138 211, V15.2.0, Jul. 2018, 98 pages.

"5G; Service requirements for next generation new services and markets (3GPP TS 22.261 version 15.5.0 Release 15)", ETSI TS 122 261, V15.5.0, Jul. 2018, 53 pages.

Extended European Search Report received for corresponding European Patent Application No. 21183016.1, dated Dec. 23, 2021, 10 pages.

Xiao et al., "An Overview on Integrated Localization and Communication Towards 6G", arXiv, Jun. 2, 2020, pp. 1-35.

\* cited by examiner

POSITIONING IN MOBILE COMMUNICATION SYSTEMS

FIELD

The present specification relates to positioning in mobile communication systems.

BACKGROUND

The use of downlink reference signals, such as positioning reference signals, and similar algorithms for determining the positioning of user devices in mobile communication systems is known. Localization with radio access technology (RAT) dependent methods have been developed for 5G New Radio (NR), and enhanced in 3GPP Rel-16, which supports high positioning accuracy. The same trend for higher accuracy continues in Rel-17 and subsequent releases. There remains a desire for further development in this field.

SUMMARY

In a first aspect, this specification describes an apparatus comprising means for performing: obtaining, at a receiver, during a first phase of operation, one or more first downlink positioning reference samples from each of a plurality of communication nodes (e.g. transmission reception points (TRPs) or base stations) of a mobile communication system, wherein the receiver operates in a wide-beam or omnidirectional mode during the first phase of operation; determining first response estimates (which may be "coarse data") of channels between the receiver and each of said each communication nodes, based on the positioning reference samples obtained for the respective communication node; selecting, for each communication node, a receiver beam for receiving positioning signals from the respective communication node, based, at least in part, on the respective first channel response estimate; and receiving, at the receiver, in a second phase of operation, one or more second downlink positioning reference samples from each of the plurality of communication nodes using the selected receiver beams (e.g. narrowband beams). Thus, coarse data may be used to select an optimum receiver beam (according to some metric) that is used in the second phase of operation.

Some example embodiments further comprise means for performing: estimating a time of arrival (ToA) and/or a distance estimate for each of a plurality of downlink positioning reference samples received during the second phase of operation. Time of arrival and/or distance estimates for multiple communication nodes can be used to generate an estimate of the position of the receiver.

The receiver beams may be selected using a machine-learning classifier (MLC). Some example embodiments further comprise means for performing: comparing an estimated distance with a known distance to form a cost function for use in training the machine-learning classifier. The machine-learning classifier may be trained using back propagation.

Some example embodiments further comprise means for performing: filtering the first channel response estimates, wherein the receiver beams are selected based on the filtered first channel response estimates. The said filtering may include using threshold levels and/or by padding data, interpolating etc.

The first channel response estimates may be channel impulse response estimates. Such channel impulse response estimates may be generated using a channel impulse response (CIR) estimator (e.g. using a digital signal processor).

The receiver may form part of a user device or user equipment (UE).

The means may comprise: at least one processor; and at least one memory including computer program code, the at least one memory and computer program code configured to, with the at least one processor, cause the performance of the apparatus.

In a second aspect, this specification describes a method comprising: obtaining, at a receiver, during a first phase of operation, one or more first downlink positioning reference samples from each of a plurality of communication nodes of a mobile communication system, wherein the receiver operates in a wide-beam or omnidirectional mode during the first phase of operation; determining first response estimates of channels between the receiver and each of said each communication nodes, based on the positioning reference samples obtained for the respective communication node; selecting, for each communication node, a receiver beam for receiving positioning signals from the respective communication node, based, at least in part, on the respective first channel response estimate; and receiving, at the receiver, in a second phase of operation, one or more second downlink positioning reference samples from each of the plurality of communication nodes using the selected receiver beams.

The method may further comprise: estimating a time of arrival and/or a distance estimate for each of a plurality of downlink positioning reference samples received during the second phase of operation. The method may further comprise: generating a position estimate based on time of arrival and/or distance estimates for multiple communication nodes.

The receiver beams may be selected using a machine-learning classifier. Some example embodiments further comprise: comparing an estimated distance with a known distance to form a cost function for use in training the machine-learning classifier.

Some example embodiments further comprise: filtering the first channel response estimates, wherein the receiver beams are selected based on the filtered first channel response estimates.

In a third aspect, this specification describes a method comprising: obtaining, at a receiver, one or more first downlink positioning reference samples from each of a plurality of communication nodes of a mobile communication system, wherein the receiver operates in a wide-beam or omnidirectional mode during the first phase of operation; labelling the first downlink positioning reference samples with known distances from the receiver to the respective communication nodes; determining first response estimates of channels between the receiver and each of said each communication nodes, based on the positioning reference samples obtained for the respective communication node; selecting, using a machine-learning classifier, for each communication node, a receiver beam for receiving positioning signals from the respective communication node, based, at least in part, on the respective first channel response estimate; receiving, at the receiver, one or more second downlink positioning reference samples from each of the plurality of communication nodes using the selected receiver beams; estimating a distance for each of a plurality of downlink positioning reference samples received during the second phase of operation; comparing the estimated distance with the known distance to form a cost function for use in training the machine-learning classifier; and training the machine-learning classifier using back propagation.

In a fourth aspect, this specification describes an apparatus configured to perform any (at least) any method as described with reference to the second or third aspects.

In a fifth aspect, this specification describes computer-readable instructions which, when executed by a computing apparatus, cause the computing apparatus to perform (at least) any method as described with reference to the second or third aspects.

In a sixth aspect, this specification describes a computer-readable medium (such as a non-transitory computer-readable medium) comprising program instructions stored thereon for performing (at least) any method as described with reference to the second or third aspects.

In a seventh aspect, this specification describes an apparatus comprising: at least one processor; and at least one memory including computer program code which, when executed by the at least one processor, causes the apparatus to perform (at least) any method as described with reference to the second or third aspects.

In an eighth aspect, this specification describes a computer program comprising instructions for causing an apparatus to perform at least the following: obtaining, at a receiver, during a first phase of operation, one or more first downlink positioning reference samples from each of a plurality of communication nodes of a mobile communication system, wherein the receiver operates in a wide-beam or omnidirectional mode during the first phase of operation; determining first response estimates of channels between the receiver and each of said each communication nodes, based on the positioning reference samples obtained for the respective communication node; selecting, for each communication node, a receiver beam for receiving positioning signals from the respective communication node, based, at least in part, on the respective first channel response estimate; and receiving, at the receiver, in a second phase of operation, one or more second downlink positioning reference samples from each of the plurality of communication nodes using the selected receiver beams.

In a ninth aspect, this specification describes a computer program comprising instructions for causing an apparatus to perform at least the following: obtaining, at a receiver, one or more first downlink positioning reference samples from each of a plurality of communication nodes of a mobile communication system, wherein the receiver operates in a wide-beam or omnidirectional mode during the first phase of operation; labelling the first downlink positioning reference samples with known distances from the receiver to the respective communication nodes; determining first response estimates of channels between the receiver and each of said each communication nodes, based on the positioning reference samples obtained for the respective communication node; selecting, using a machine-learning classifier, for each communication node, a receiver beam for receiving positioning signals from the respective communication node, based, at least in part, on the respective first channel response estimate; receiving, at the receiver, one or more second downlink positioning reference samples from each of the plurality of communication nodes using the selected receiver beams; estimating a distance for each of a plurality of downlink positioning reference samples received during the second phase of operation; comparing the estimated distance with the known distance to form a cost function for use in training the machine-learning classifier; and training the machine-learning classifier using back propagation.

In a tenth aspect, this specification describes an apparatus comprising: a correlation module (or some other means) for obtaining, at a receiver, during a first phase of operation, one or more first downlink positioning reference samples from each of a plurality of communication nodes of a mobile communication system, wherein the receiver operates in a wide-beam or omnidirectional mode during the first phase of operation; a channel estimator module, such as a channel impulse response estimator (or some other means) for determining first response estimates of channels between the receiver and each of said each communication nodes, based on the positioning reference samples obtained for the respective communication node; a classifier (or some other means) for selecting, for each communication node, a receiver beam for receiving positioning signals from the respective communication node, based, at least in part, on the respective first channel response estimate; and a receiver (or some of means) for receiving, in a second phase of operation, one or more second downlink positioning reference samples from each of the plurality of communication nodes using the selected receiver beams.

In an eleventh aspect, this specification describes an apparatus comprising: a correlation module (or some other means) for obtaining, at a receiver, one or more first downlink positioning reference samples from each of a plurality of communication nodes of a mobile communication system, wherein the receiver operates in a wide-beam or omnidirectional mode during the first phase of operation; a control module (or some other means) for labelling the first downlink positioning reference samples with known distances from the receiver to the respective communication nodes; a channel estimator module, such as a channel impulse response estimator (or some other means) for determining first response estimates of channels between the receiver and each of said each communication nodes, based on the positioning reference samples obtained for the respective communication node; a machine-learning classifier (or some of means) for selecting, for each communication node, a receiver beam for receiving positioning signals from the respective communication node, based, at least in part, on the respective first channel response estimate; a receiver (or some other means) for receiving one or more second downlink positioning reference samples from each of the plurality of communication nodes using the selected receiver beams; a digital signal processor (or some other means) for estimating a distance for each of a plurality of downlink positioning reference samples received during the second phase of operation; a cost function generator (or some other means) for comparing the estimated distance with the known distance to form a cost function for use in training the machine-learning classifier; and a training module (or some other means) for training the machine-learning classifier using back propagation.

BRIEF DESCRIPTION OF DRAWINGS

Example embodiments will now be described, by way of non-limiting examples, with reference to the following schematic drawings, in which.

DETAILED DESCRIPTION

Figure 1:
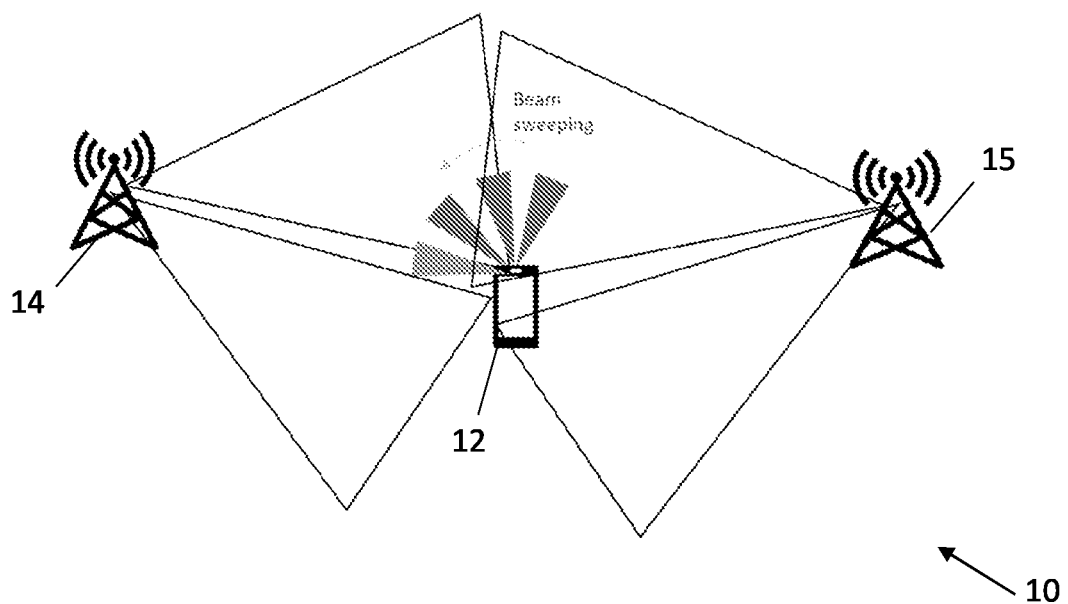
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the to invention.

In the description and drawings, like reference numerals refer to like elements throughout.

FIG. 1 is a block diagram of a system, indicated generally by the reference numeral to, in accordance with an example embodiment. The system to comprises a user device 12, a first base station 14 and a second base station 15. The base stations 14 and 15 are examples of transmission reception points (TRPs).

To enable high accuracy positioning at the user device 12 based on positioning reference signals (or some other downlink reference signals) received from the first base station 14 and/or the second base station 15, both the transmitter (e.g. the relevant base station or some other TRP) and receiver (e.g. the user device) may apply spatial beamforming, i.e. spatially orient themselves towards each other. To do that however, both transmitter and receiver may first scan the environment with all their TX/RX beams and select the beam that provides the best link quality.

In downlink (DL) positioning, the link quality may be related to the beam Reference Signal Received Power (RSRP) of the relevant beams, accuracy of time of arrival (TOA), angle of arrival (AOA), etc. For the user device 12 to select a best UE RX beam for each of a plurality of TRPs (e.g. base stations) from which the user device receives positioning reference signals, the user device 12 may perform an exhaustive sweep and measure tens of signals sequentially, with each RX beam. This results in computational and reporting overhead as well as positioning latency. This positioning latency may be unacceptable, since the user device should detect and report tens of TRP beams with each of its own beams, in a time short enough to ensure positioning integrity, i.e. the user device should finish the measurements before its position or orientation has changed, all while fulfilling the network latency requirements.

Take the following example scenario:

Assume that the user device 12 has a latency requirement of MaxLat=10 ms for providing the LTE Positioning Protocol (LPP) positioning measurement report. Assume also that the user device 12 is equipped with R=4 RX beams and is instructed by a location management function (LMF) to measure 6 TRPs, each with P=4 beams. Each beam is repeated only once. In other words, the user device 12 needs to detect 96 beamed positioning reference signals (PRS).

Assume the best case scenario in which the PRS signals are orthogonalized in code and space, therefore all TRP are able to simultaneously send each of their beams:

Slot 1: (beam 1, TRP 1), (beam 1, TRP 2), . . . , (beam 1, TRP 6).

Slot i: (beam i, TRP 1), . . . , (beam i, TRP 6).

This means that the PRS transmission lasts P=4 slots. If these slots are assigned consecutively, then the user device does not have enough time to switch between its own RX beams (beam switch time may be about 3 ms), therefore the beamed PRS must be repeated R=4 times in order for the user device to have activated and measured all its R=4 UE RX beams. Thus, the measurement process lasts for T=PR slots+delta>>PR ms=16 ms, where delta accounts for UE beam switching delay. The reporting process takes an additional V slots (required for the user device to get allocated and transmit the report). This means that the network obtains the user device measurements in (T+V) slots=PR+delta+V>>>16 ms>MaxLat.

The total latency associated with the exhaustive UE RX beam scanning is typically larger (e.g. significantly larger) than the allowed latency, therefore other methods must be employed.

Figure 2:
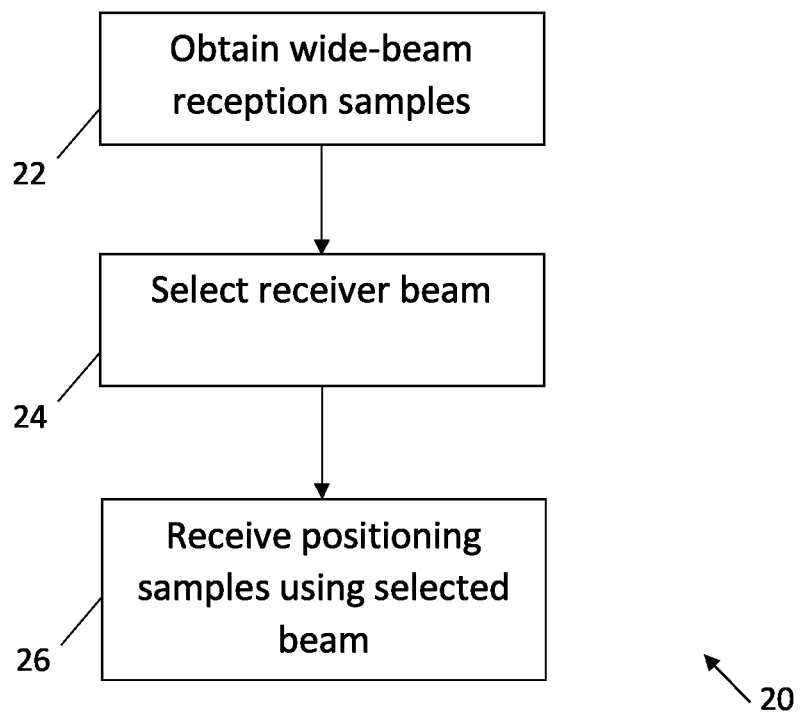
FIG. 2 is a flow chart showing an algorithm in accordance with an example embodiment.

FIG. 2 is a flow chart showing an algorithm, indicated generally by the reference numeral 20, in accordance with an example embodiment.

The algorithm 20 starts at operation 22, where, during a first phase of operation, one or more first downlink positioning reference samples are received (e.g. at a user device) from each of a plurality of communication nodes (e.g. TRPs) of a mobile communication system, wherein the receiver operates in a wide-beam or omnidirectional mode during the first phase of operation. The obtaining step 22 may be implemented by correlating received signals with the (known) transmitted positioning reference signals, although other detection methods may be used (e.g. checking the received PRS power from each of a plurality of TRP beams).

At operation 24, a receiver beam is selected, for each communication node, for receiving positioning signals from the respective communication node. As discussed in detail below, the operation 24 may be implemented by determining first response estimates (e.g. channel impulse responses) of channels between the receiver and each communication node based on the positioning reference samples obtained for the respective communication node. The receiver beam may then be selected based on the respective first channel response estimate At operation 26, one or more second downlink positioning reference samples are received from each of the plurality of communication nodes using the receiver beams selected in operation 24.

The algorithm seeks to select the optimum beam for receiving positioning reference signals (in the operation 24) based on coarse channel data determined based on the wide-beam signals (obtained in the operation 22). If an optimum beam can be selected, then good link quality can be ensured and hence good user device positioning, without the need for exhaustive beam sweeping. Moreover, a measurement report (e.g. ToA details may be made available with lower delay at the location management function (MLF)).

Figure 3:
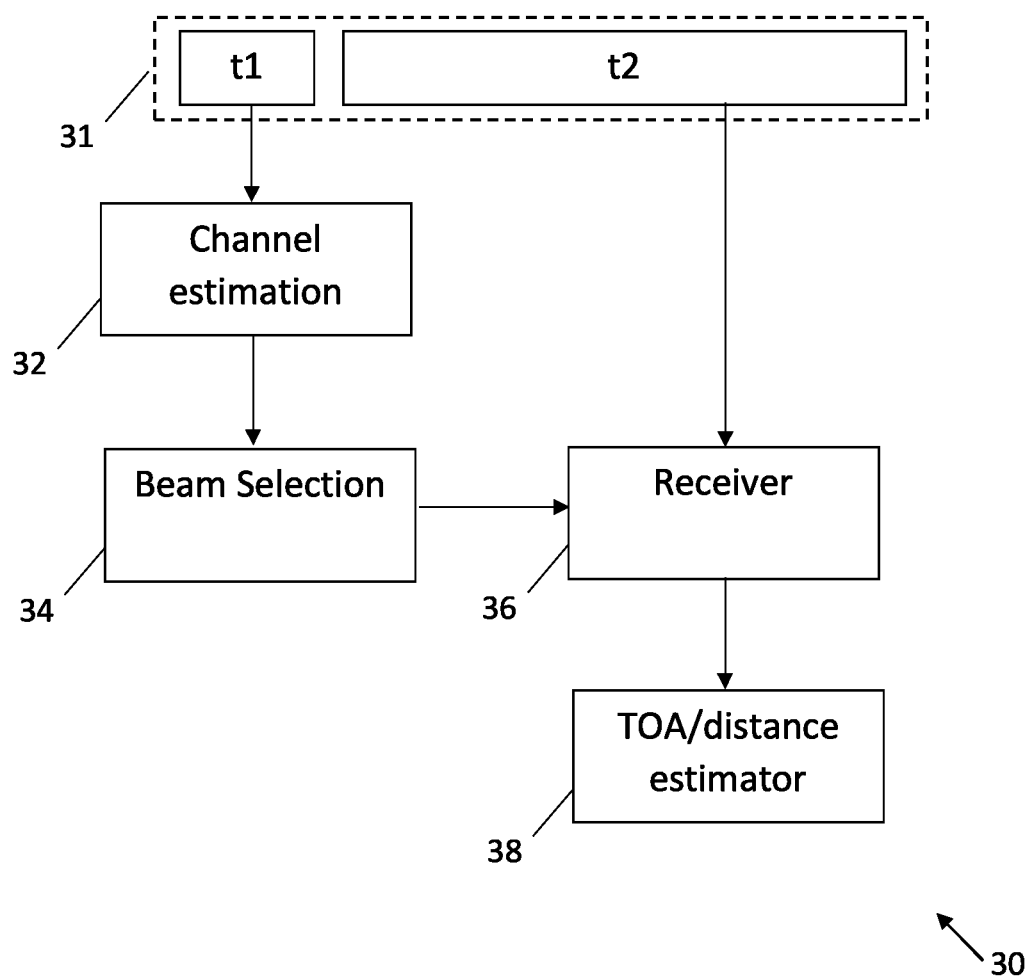
FIG. 3 is a block diagram of a system in accordance with an example embodiment.

FIG. 3 is a block diagram of a system, indicated generally by the reference numeral 30, in accordance with an example embodiment. The system 3o may be used to implement 3o the algorithm 20 described above.

The system 3o comprises a channel estimation module 32, a beam selection module 34, a receiver 36 and a time of arrival (TOA) or distance estimator 38.

In the system 30, a signal 31 is received. The signal 31 has a first phase (time period t1) and a second phase (time period t2).

During time period t1, the user device collects signal samples in an omnidirectional or wide-beam reception mode (thereby implementing operation 22 of the algorithm 20). The received samples are used by the channel estimation module 32 to compute channel estimates (e.g. channel impulse response (CIR) estimates, power delay profile, power metrics etc.). The channel estimation module 32 may be implemented using a conventional digital signal processor (DSP) CIR estimator.

The channel estimates are processed by the beam selection module 34 to generate a user device beam index (or beam identifier) j for use in the second mode of operation. As discussed in detail below, the beam selection module 34 may be implemented using a machine-learning classifier (MLC). The beam selection module 34 thereby implements the operation 24 of the algorithm 20.

During time period t2, the receiver 36 uses the beam index j output by the beam selection module 34 to collect signal samples, thereby implementing operation 26 of the algorithm 20.

The signal samples obtained by the receiver 36 are provided to the TOA/distance estimator 38, which may be implemented using a digital signal processor (DSP). As discussed further below, the TOA/distance estimator 38 can be used to estimate a time of arrival and/or a distance for each of a plurality of downlink positioning reference samples received during the second phase of operation. TOA/distance estimates obtained by the estimator 38 can be used to generate a position estimate for the user device (e.g. using the principles of triangulation).

Thus, in some example embodiments, the system 30 seeks to obtain the best user device RX narrow beam for downlink PRS reception to enable high accuracy downlink positioning. As discussed in detail below, the system 30 may be implemented by cascading digital signal processing (DSP) blocks with a machine learning classifier (MLC) to create a hybrid structure that reconstructs narrow-beamed channels from a wide-beam/omni reception using a cost function based on the geometrical distance between each transmitter and receiver. It should be noted that other cost functions may be used (for example, a cost function based on position estimation error).

Figure 4:
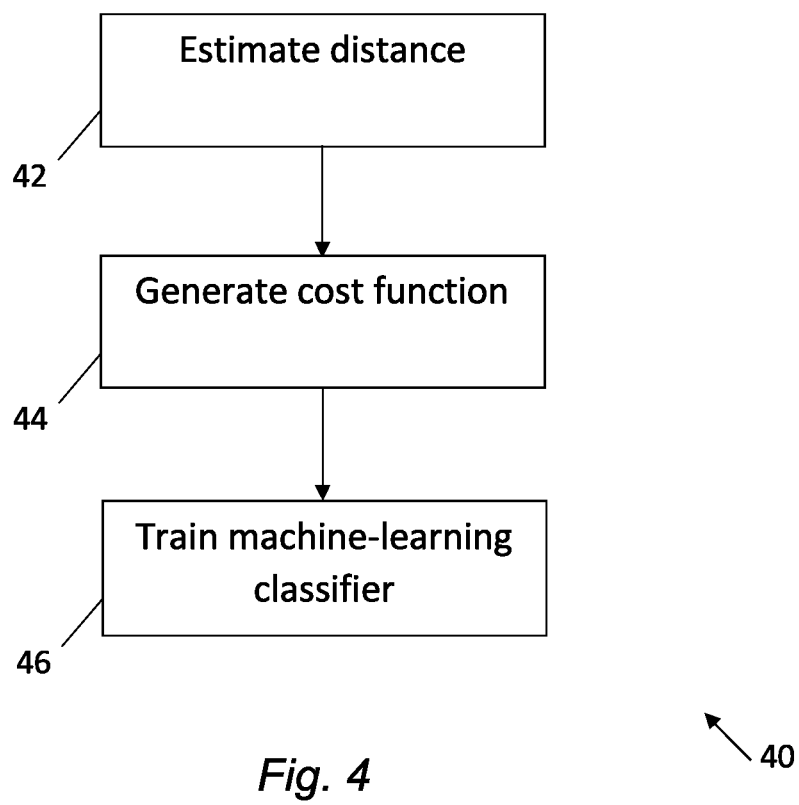
FIG. 4 is a flow chart showing an algorithm in accordance with an example embodiment.

FIG. 4 is a flow chart showing an algorithm, indicated generally by the reference numeral 40, in accordance with an example embodiment. The algorithm 40 may be used to train a machine-learning classifier for use as the beam selection module 34 described above.

The algorithm 4o starts at operation 42, where a distance between a receiver at the user device and a transmitter is estimated, as discussed above.

At operation 44, the estimated distance is compared with a known distance to generate to a cost function for use in training the machine-learning classifier. (Note that in this example embodiment, the training phase optimises for distance estimation, rather than for received signal strength.)

At operation 46, a machine-learning classifier for use in implementing the beam selecting module (e.g. the module 34 discussed above) is trained using back propagation (e.g. backpropagation through the machine-learning classifier and a digital signal processor (DSP) used to generate the channel impulses response and/or the distance estimate).

Figure 5:
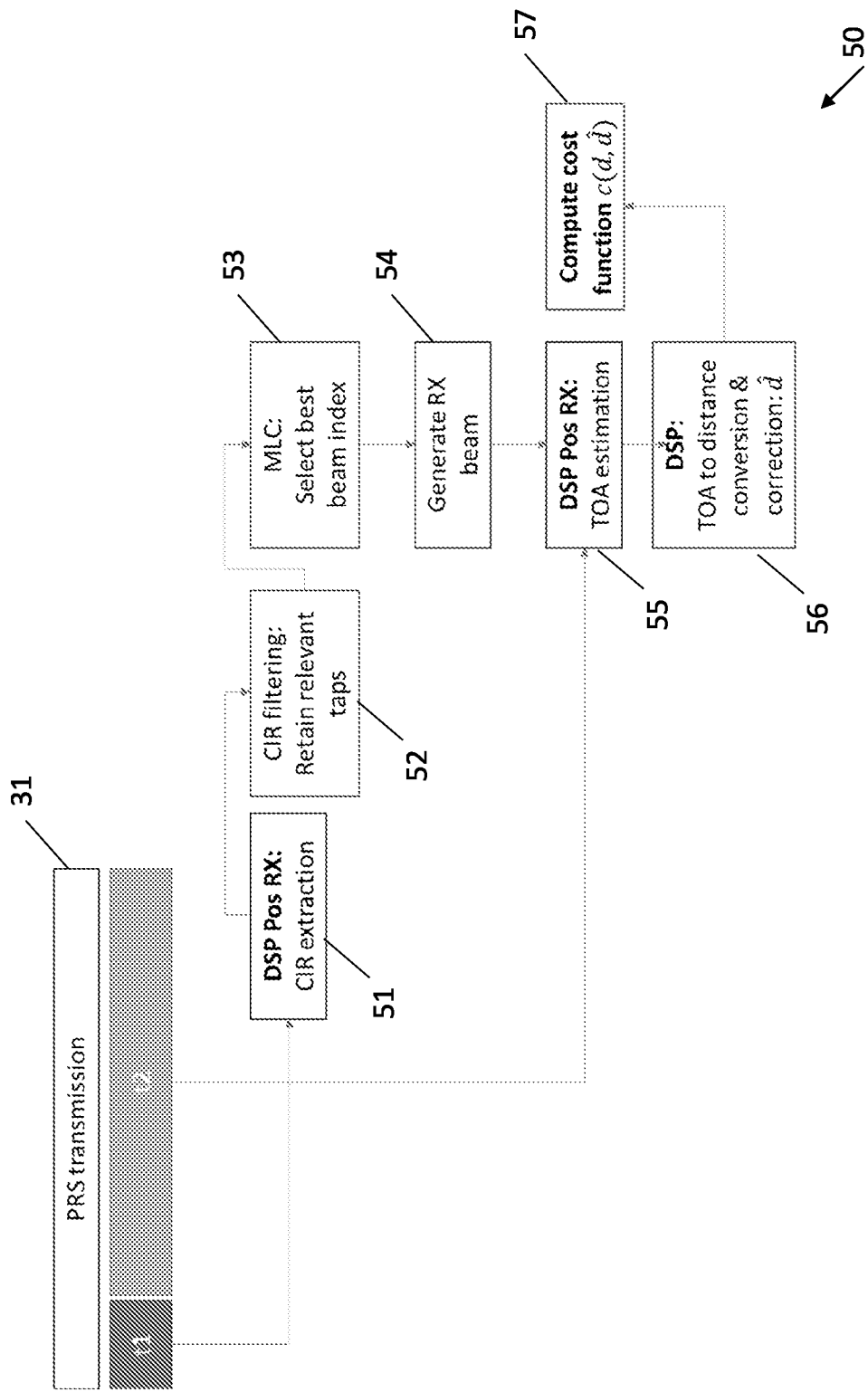
FIG. 5 is a block diagram of a system in accordance with an example embodiment.

FIG. 5 is a block diagram of a system, indicated generally by the reference numeral 50, in accordance with an example embodiment. The system 50 is similar to the system 30 described above, but more detail is provided. The system 50 may be used to implement the algorithm 40.

The system 50 receives the signal 31 described above (that signal having a first phase (time period t1) and a second phase (time period t2)).

The system 50 comprises a CIR extractor module 51, a CIR filtering module 52, a machine-learning classifier 53, an RX beam generator 54, a TOA estimation module 55, a TOA to distance conversion module 56 and a cost function generator 57.

The CIR extractor module 51 and the CIR filtering module 52 may be used to implement the channel estimation module 32 of the system 30. The machine-learning classifier 53 may be used to implement the beam selection module 34 of the system 30. The RX beam generator 54 may be used to implement the receiver 36 of the system 30. The TOA estimation module 55 and the TOA to distance conversion module 56 may be used to implement the time of arrival (TOA) or distance estimator 38 of the system 30 (and to implement the operation 42 of the algorithm 40). In addition, the cost function generator 57 may be used to implement the operation 44 of the algorithm 40.

In the use of the system 50, a downlink positioning receiver is instructed by the network to listen for one or more PRS p(t) within a given time interval T=(t1, t2).

During a first small reception window t1 of the signal 31, the user device listens for p(t) using no/wide RX beamforming and collects N wide-beam samples r(1), . . . r(N) (thereby to implementing operation 22 of the algorithm 20 described above). The received signal is the superimposition of all TX PRS, each convolved with their own channel impulse response (CIR) and corrupted by additive white Gaussian noise (AWGN). These samples are used by the CIR extractor module 51 to obtain wide-beam channel state information such as power delay profile (PDP), channel impulse response (CIR) and channel frequency response (CFR). As discussed further below, CIR extractor module 51 may output a CIR profile (per detected TRP) with taps on a delay grid with a UE-specific resolution.

Thus, the user device applies a RX wide/no beamformer and collects the received positioning reference signal (PRS) samples r(1:N). Note that these PRS may or may not have been TX beamformed at the TRP. As noted above, other downlink reference signals may be used instead of the position reference signals discussed in this embodiment.

The CIR filtering module 52 may be used to clip the wide-beam CIR profile (also called omni-CIR) output by the CIR extractor module 51, for example to a fixed length, by applying a user device-specific filter. For example, the filter may retain the X strongest taps (each with real, imaginary parts and index delay), or the taps with power within Y dB from the maximum power tap.

The filtered omni-CIR output by the CIR filtering module 52 is provided to the machine learning classifier 53, which classifier seeks to output the index j of the best user device RX narrow beam for each detected TRP. The classifier 53 may be multiclass and may implement a one-hot encoding output to the best beam index. In another implementation, the CIR may be replaced with the phases of the most relevant taps and fed to the classifier.

During a second time interval t2, the user device applies the selected RX beamformer $W_j$ (as output by MLC and implemented by the RX beam generator 54), where $w_j$ is a vector of beamforming weights used to generate the RX beam with index j, and observes the UE-beamformed signal and collects the beamformed signal samples y(N+1:M).

The narrowbeam signal y(N+1: M)=$W_j^H$r(N+1, M) is used by the TOA estimation module 55 to estimate TOA r and the TOA to distance conversion module 56 to generate a distance estimate (thereby implementing operation 42 of the algorithm 40). The estimated distances may be corrected (d=Cτ+ξ) to account for AWGN errors and other UE non-linearities such as clock drifts.

To train MLC 53, the resulting estimated distance $\hat{d}$ is compared in the training phase with the real distance and a cost function C=dist(d, $\hat{d}$), e.g. Euclidian norm between true and estimated distances, is computed (see operation 44 of the algorithm 40). The cost function is generated by the cost function generator 57 and is backpropagated to train the MLC 53, thereby implementing operation 46 of the algorithm 40.

Figure 6:
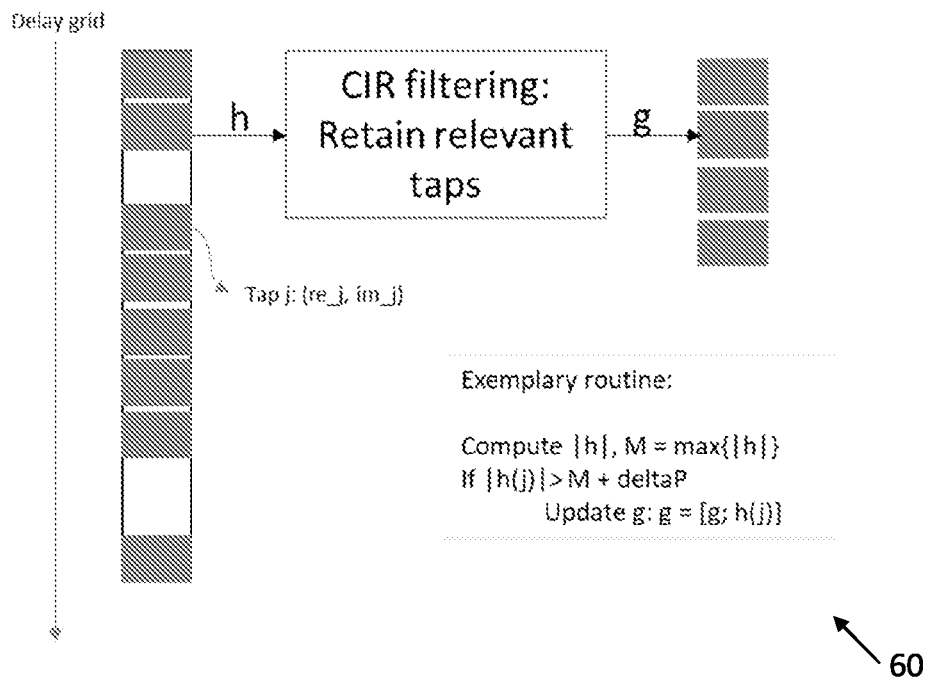
FIGS. 6 to 8 are block diagram of modules in accordance with example embodiments.

FIG. 6 is a block diagram of a module, indicated generally by the reference numeral 60, in accordance with an example embodiment. The module 60 is an example implementation of the CIR filtering module 52 described above.

In the module 60, the filtering of the CIR taps has the role of homogenizing the data that is provided to the input of the MLC. For example, the input vector length may be fixed. To that end, depending on the estimated CIR length, the filtering may consist of one or more of:

Removing taps with power below a certain threshold, e.g. relative to the maximum power tap, or relative to an estimated SNR level (exemplary implementation in the figure).

Zero-padding the estimates in case of severely sparse initial estimates.

Interpolating missing values, etc.

Figure 7:
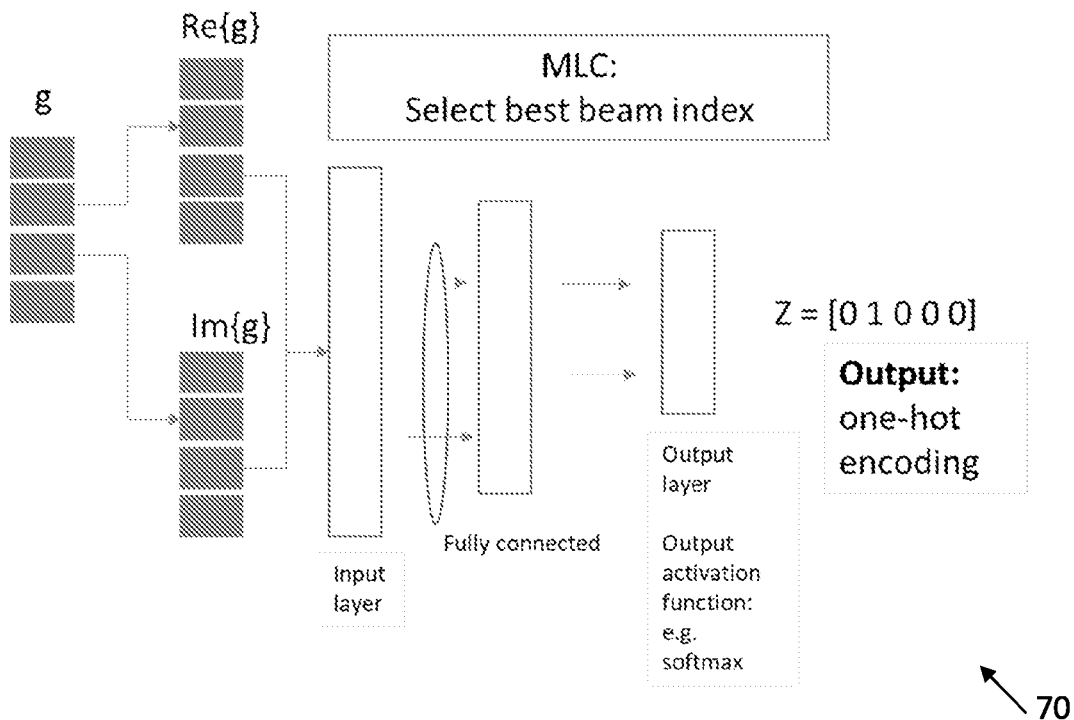

FIG. 7 is a block diagram of a module, indicated generally by the reference numeral 70, in accordance with an example embodiment. The system 70 is an example implementation of the machine-learning classifier (MLC) 53. The ML classifier seeks to output the best beam index in the form e.g. of a binary vector containing a 1 on the location of the best index or a vector of probabilities, where in the i-th entry corresponds to the probability that the best beam is beam i. As discussed above, the MLC 53 receives as input the omni-CIR estimates and may be implemented as a deep neural network as depicted in FIG. 7. It should be noted that the module 70 is provided by way of example; other implementations exist.

Figure 8:
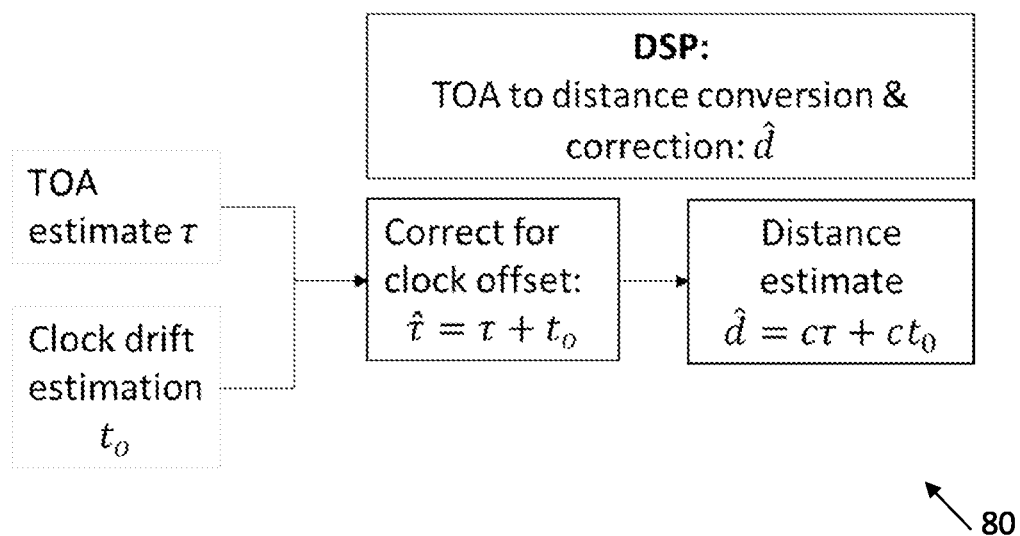

FIG. 8 is a block diagram of a module, indicated generally by the reference numeral 80, to in accordance with an example embodiment. The module 80, which may form part of the TOA to distance conversion module 56 described above, includes (by way of example) a mechanism for correcting for clock offsets.

Figure 9:
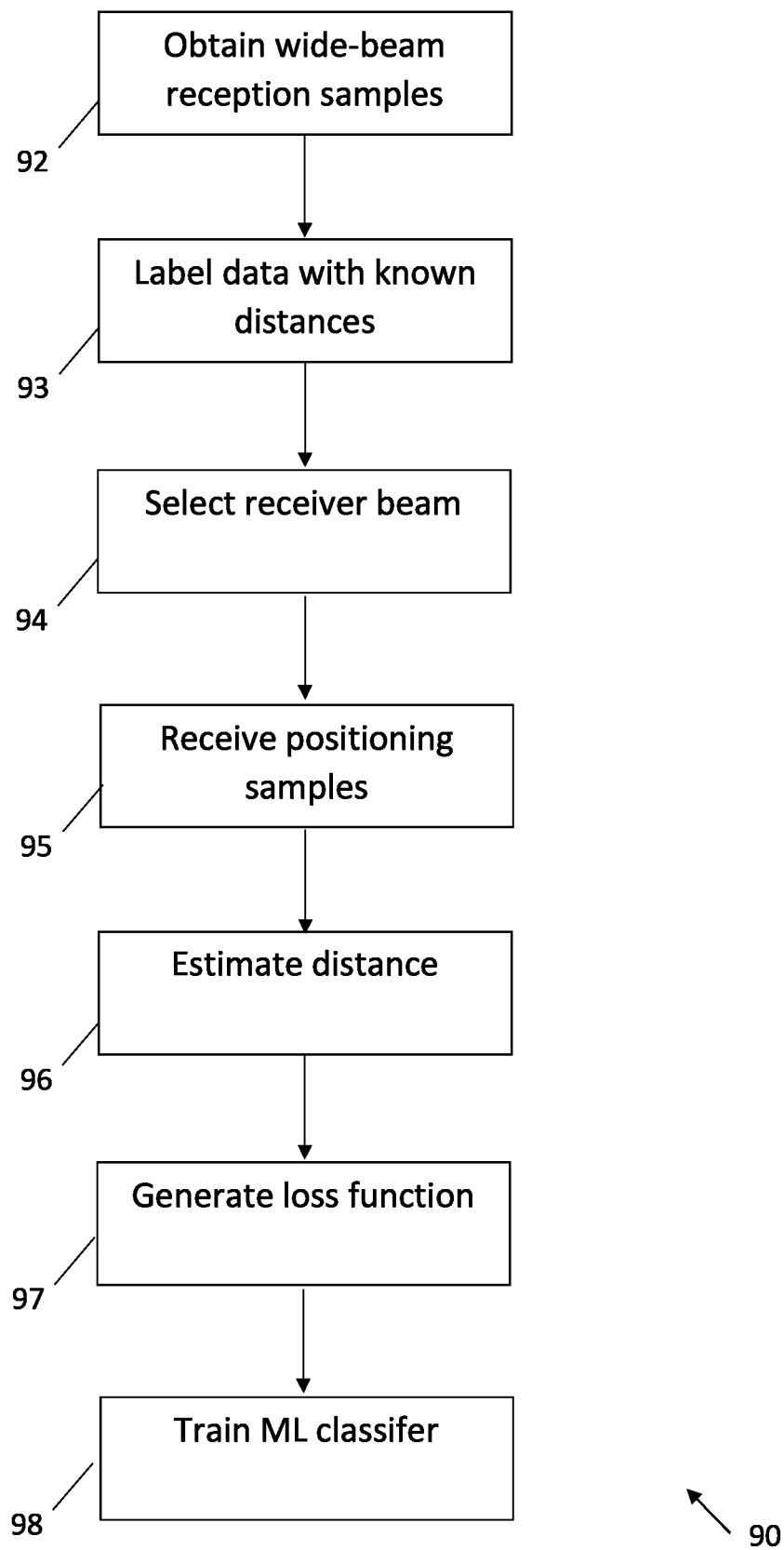
FIG. 9 is a flow chart showing an algorithm in accordance with an example embodiment.

FIG. 9 is a flow chart showing an algorithm, indicated generally by the reference numeral 90, in accordance with an example embodiment. The algorithm 90 may be used to train the MLC 53 described above.

The algorithm 90 starts at operation 92, where one or more first downlink positioning reference samples (or some other downlink reference signals) are obtained at a receiver from each of a plurality of communication nodes of a mobile communication system.

The receiver operates in a wide-beam or omnidirectional mode such that wide-beam reception sampled are obtained.

The operation 92 may include collecting omni-CIR measurements (e.g. using the CIR extractor module 51) and optionally filtering the CIR measurements (e.g. using the CIR filtering module 52).

At operation 93, the first downlink positioning reference samples are labelled with known distances from the receiver to the respective communication nodes. These labels can be used for training purposes, as discussed further below.

At operation 94, a receiver beam is selected for receiving positioning signals from the respective communication node. The operation 94 may include determining first response estimates of channels between the receiver and each of said each communication nodes and selecting the receiver beam based on the respective first channel response estimate (e.g. using the MLC 53 described above). For example, the classifier being trained by the algorithm 90 may be used to implement the operation 94.

At operation 95, one or more second downlink positioning reference samples are received from each of the plurality of communication nodes using the receiver beams selected in the operation 94 (e.g. such that narrow TX-RX beams are used).

At operation 96, a distance is estimated for each of a plurality of downlink positioning reference samples.

At operation 97, the estimated distance is compared with the known distance (based on the label generated in operation 93) to form a cost function for use in training the machine-learning classifier (MLC). For example, the cost function generator 57 described above may be used.

Finally, at operation 98, the MLC is trained using back propagation. Note that the MLC may be first trained in the cloud and downloaded at the relevant user device, or trained directed at the user device (e.g. in a lab environment).

Figure 10:
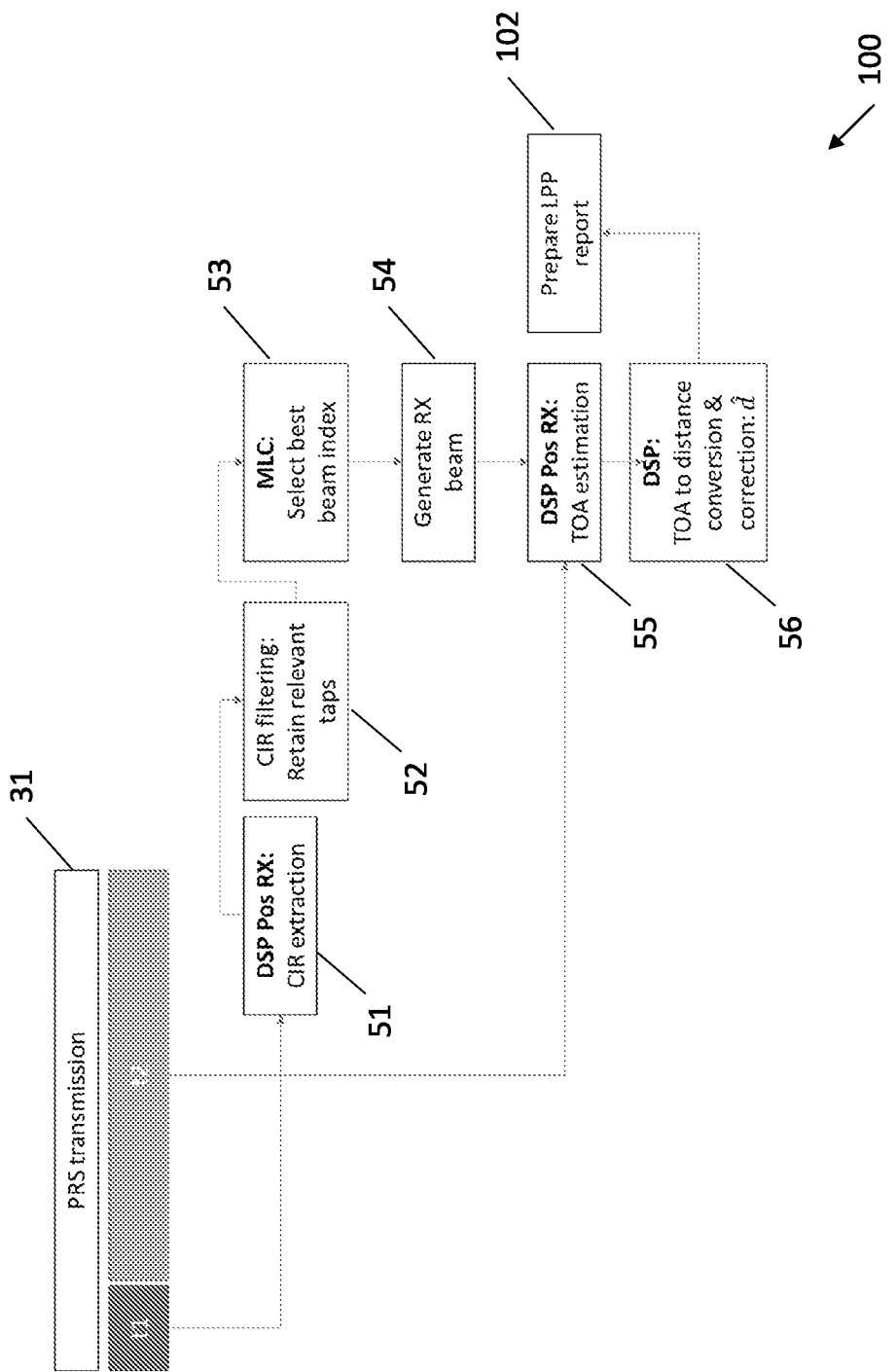
FIG. 10 is a block diagram of a system in accordance with an example embodiment.

FIG. 10 is a block diagram of a system, indicated generally by the reference numeral 100, in accordance with an example embodiment.

The system 100 includes the CIR extractor module 51, the CIR filtering module 52, the machine-learning classifier 53, the RX beam generator 54, the TOA estimation module 55, and the TOA to distance conversion module 56 of the system 50 described above. However, whilst the system 50 includes a cost function generator 57 (for use in training), the system 100 includes a positioning report generation module 102 for use in deployment of the principles described herein. The module 102 may, for example, generate an LTE Positioning Protocol (LPP) report. Of course, an example system may include both the cost function generator 57 and the positioning report generation module 102 (for use in training and deployment respectively).

Figure 11:
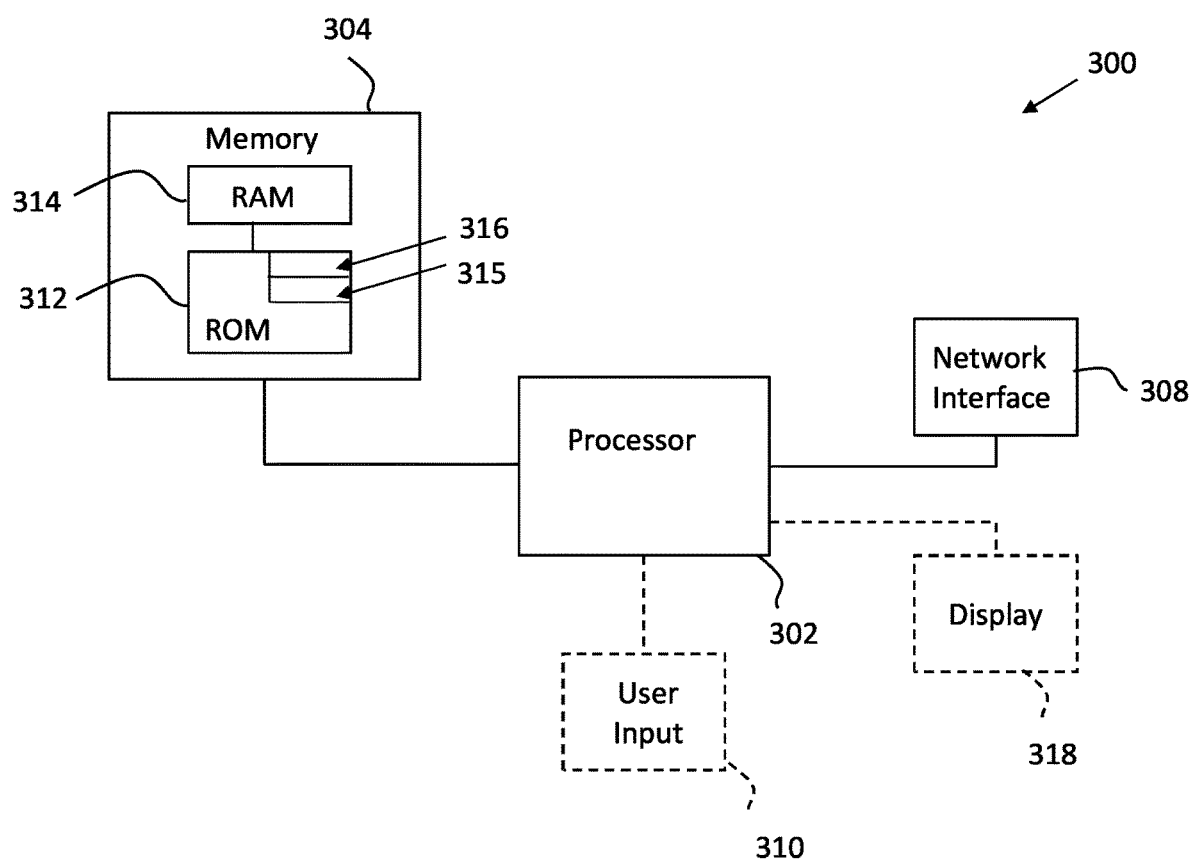
FIG. 11 is a block diagram of components of a system in accordance with an example embodiment.

For completeness, FIG. 11 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and message sequences 20, 40 and 90 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 12A:
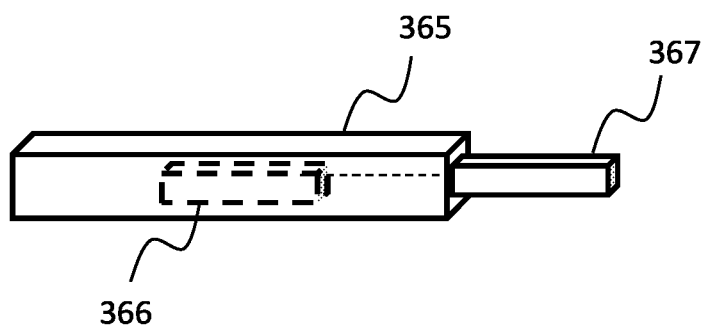
FIGS. 12A and 12B show tangible media, respectively a removable non-volatile memory unit and a compact disc (CD) storing computer-readable code which when run by a computer perform operations according to example embodiment.
Figure 12B:
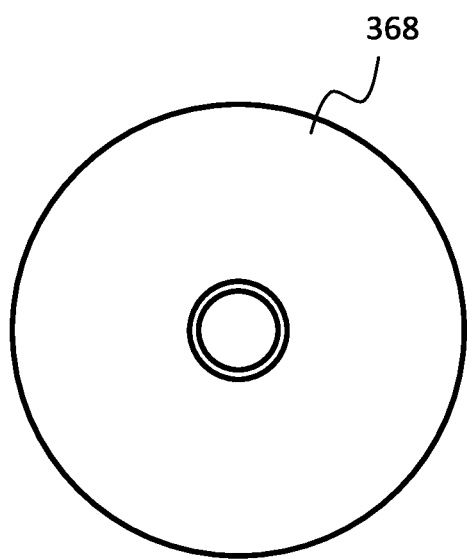

FIGS. 12A and 12B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 2, 4 and 9 are examples only and that various operations depicted therein may be omitted, reordered and/or combined.

It will be appreciated that the above described example embodiments are purely illustrative and are not limiting on the scope of the invention. Other variations and m modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one memory including computer program code which, when executed by the at least one processor, causes the apparatus to perform:
obtaining, at a receiver, during a first phase of operation, one or more first downlink positioning reference samples from each of a plurality of communication nodes of a mobile communication system, wherein the receiver operates in a wide-beam or omnidirectional mode during the first phase of operation;
determining first response estimates of channels between the receiver and each of said each communication nodes, based on the positioning reference samples obtained for the respective communication node;
selecting, for each communication node, a receiver narrowband beam for receiving positioning signals from the respective communication node, based, at least in part, on the respective first channel response estimate, wherein the receiver narrowband beams are selected using a machine-learning classifier; and
receiving, in a second phase of operation, one or more second downlink positioning reference samples from each of the plurality of communication nodes using the selected receiver narrowband beams.

2. An apparatus as claimed in claim 1, wherein the at least one memory and the computer program code are configured to, with the at least processor, cause the apparatus to:
estimate a time of arrival and/or a distance estimate for each of a plurality of downlink positioning reference samples received during the second phase of operation.

3. An apparatus as claimed in claim 1, wherein the at least one memory and the computer program code are configured to, with the at least processor, cause the apparatus to:
  compare an estimated distance with a known distance to form a cost function for use in training the machine-learning classifier.

4. An apparatus as claimed in claim 3, wherein the at least one memory and the computer program code are configured to, with the at least processor, cause the apparatus to:
  train the machine-learning classifier using back propagation.

5. An apparatus as claimed in claim 1, wherein the at least one memory and the computer program code are configured to, with the at least processor, cause the apparatus to:
  filter the first channel response estimates, wherein the receiver narrowband beams are selected based on the filtered first channel response estimates.

6. An apparatus as claimed in claim 1, wherein the first channel response estimates are channel impulse response estimates.

7. An apparatus as claimed in claim 1, wherein the receiver forms part of a user device.

8. A method comprising:
  obtaining, at a receiver, during a first phase of operation, one or more first downlink positioning reference samples from each of a plurality of communication nodes of a mobile communication system, wherein the receiver operates in a wide-beam or omnidirectional mode during the first phase of operation;
  determining first response estimates of channels between the receiver and each of said each communication nodes, based on the positioning reference samples obtained for the respective communication node;
  selecting, for each communication node, a receiver narrowband beam for receiving positioning signals from the respective communication node, based, at least in part, on the respective first channel response estimate, wherein the receiver narrowband beams are selected using a machine-learning classifier; and
  receiving, at the receiver, in a second phase of operation, one or more second downlink positioning reference samples from each of the plurality of communication nodes using the selected receiver narrowband beams.

9. A method as claimed in claim 8, further comprising:
  estimating a time of arrival and/or a distance estimate for each of a plurality of downlink positioning reference samples received during the second phase of operation.

10. A method as claimed in claim 8, further comprising:
  comparing an estimated distance with a known distance to form a cost function for use in training the machine-learning classifier.

11. A method as claimed in claim 8, further comprising:
  filtering the first channel response estimates, wherein the receiver narrowband beams are selected based on the filtered first channel response estimates.

12. A method as claimed in claim 8, wherein the first channel response estimates are channel impulse response estimates.

13. A method as claimed in claim 8, wherein the receiver forms part of a user device.

14. A method comprising:
  obtaining, at a receiver, one or more first downlink positioning reference samples from each of a plurality of communication nodes of a mobile communication system, wherein the receiver operates in a wide-beam or omnidirectional mode during the first phase of operation;
  labelling the first downlink positioning reference samples with known distances from the receiver to the respective communication nodes;
  determining first response estimates of channels between the receiver and each of said each communication nodes, based on the positioning reference samples obtained for the respective communication node;
  selecting, using a machine learning classifier, for each communication node, a receiver narrowband beam for receiving positioning signals from the respective communication node, based, at least in part, on the respective first channel response estimate;
  receiving, at the receiver, one or more second downlink positioning reference samples from each of the plurality of communication nodes using the selected receiver narrowband beams;
  estimating a distance for each of a plurality of downlink positioning reference samples received during the second phase of operation;
  comparing the estimated distance with the known distance to form a cost function for use in training the machine-learning classifier; and
  training the machine-learning classifier using back propagation.

15. A non-transitory computer readable medium comprising program instructions stored thereon for performing at least the following:
  obtaining, at a receiver, during a first phase of operation, one or more first downlink positioning reference samples from each of a plurality of communication nodes of a mobile communication system, wherein the receiver operates in a wide-beam or omnidirectional mode during the first phase of operation;
  determining first response estimates of channels between the receiver and each of said each communication nodes, based on the positioning reference samples obtained for the respective communication node;
  selecting, for each communication node, a receiver narrowband beam for receiving positioning signals from the respective communication node, based, at least in part, on the respective first channel response estimate, wherein the receiver beams are selected using a machine-learning classifier; and
  receiving, at the receiver, in a second phase of operation, one or more second downlink positioning reference samples from each of the plurality of communication nodes using the selected receiver narrowband beams.

* * * * *